June 25, 1946.  R. N. BEAN  2,402,723
MEANS AND METHOD OF SEALING AND TESTING WELL HEAD CONNECTIONS
Original Filed Sept. 9, 1940  3 Sheets-Sheet 3

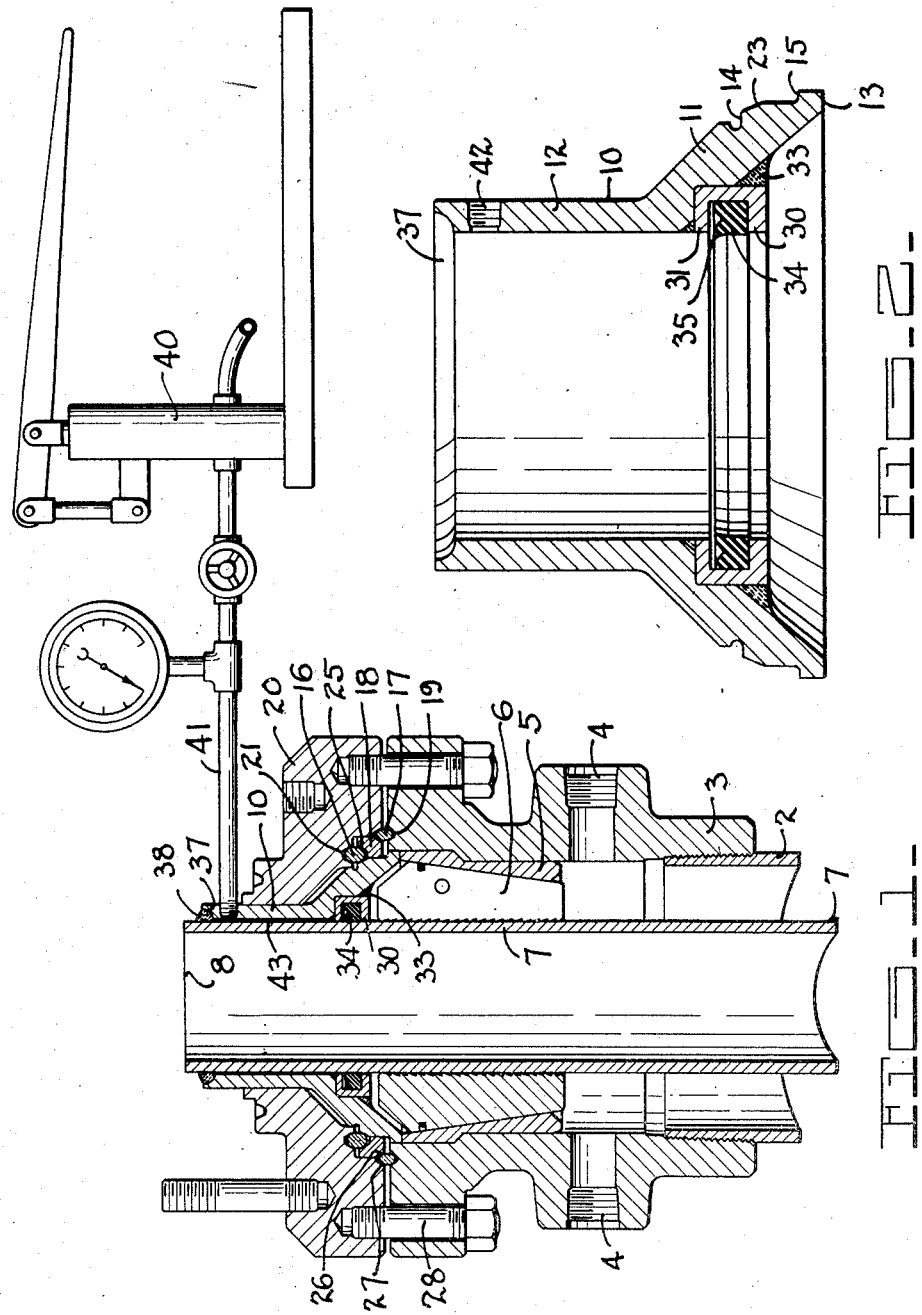

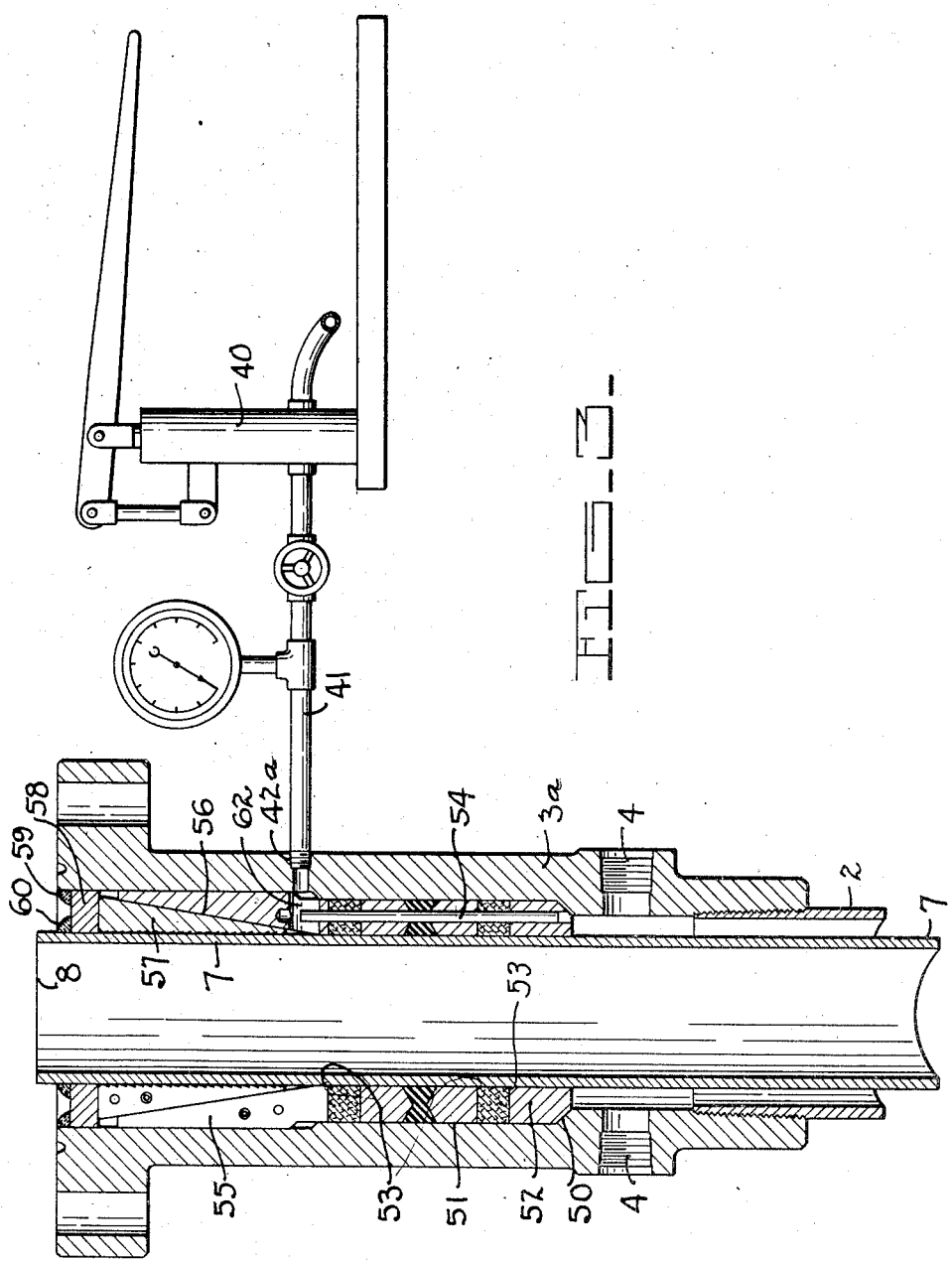

RURIC N. BEAN
INVENTOR
BY Lester B. Clarke
ATTORNEY

Patented June 25, 1946

2,402,723

UNITED STATES PATENT OFFICE 2,402,723

MEANS AND METHOD OF SEALING AND TESTING WELLHEAD CONNECTIONS

Ruric N. Bean, Houston, Tex., assignor to Cameron Iron Works, Houston, Tex., a corporation of Texas Continuation of application Serial No. 356,015, September 9, 1940. This application December 10, 1943, Serial No. 513,750

20 Claims. (Cl. 166—14)

This invention relates to a means and method of sealing and testing well head connections where a string of pipe is to be suspended in the well bore.

The present application is a continuation of my prior co-pending application, Serial No. 356,-015, filed September 9, 1940, for Means and method of testing welded wellhead connections, and relates broadly to the subject matter of the co-pending joint application of Ruric N. Bean, James S. Abercrombie, and Herbert Allen, Serial No. 272,578, filed May 9, 1939, now Patent #2,350,867, dated June 6, 1944 for Sealing and testing wellhead connections, and is entitled to the benefit of the filing date thereof as to all common subject matter.

In completing wells drilled by the rotary method several strings of pipe may be lowered into the well bore after the drilling operation has been completed, and in order to prevent the pressures in the well bore from displacing the strings of pipe when they are landed the practice has grown up of running the string of pipe into the well and determining the length of such string of pipe. The pipe is then cut off at the desired elevation and the upper end welded or otherwise suspended and sealed to a hold down body or flange which is in turn positioned upon the casing head or other well head member.

The production fittings are then attached above the suspended and sealed portion and the well is completed. It is necessary to separate the pressures which are present inside of the production string from the outside of the production string inside of the well casing because the higher pressure is always present in the production string and if the weld or other seal leaks this pressure will cause a flow down around the outside of the production string or casing and may cause leakage or difficulty at ony one of a number of points. The present invention, therefore, concerns itself with providing two seals about the pipe, one of which may be a weld of the type referred to, so as to provide an additional safeguard against such leakage, and to provide a means for testing such seals.

It is therefore a general object of this invention to provide a pipe support and seal and make possible the testing of the seal.

It is another object of this invention to provide a pipe support wherein a string of pipe is welded or otherwise sealed to the support adjacent the upper end thereof.

Another object of this invention is to provide a method and apparatus for applying pressure to a weld or other seal at the upper end of a pipe in a well in order to test the seal for leakage.

Another object of this invention is to provide a pair of spaced seals about a casing or similar pipe, together with a means for testing such seals.

Another object of this invention is to provide a means and method for testing a weld or similar seal on a string of pipe by applying pressure to it as the pipe is suspended in the well.

Another object of this invention is to provide a means for applying test pressure to a pair of spaced seals about a pipe without danger of collapsing the pipe.

Other objects of this invention will become apparent from the following description taken in connection with the accompanying drawings wherein are set forth and disclosed certain embodiments of this invention, it being understood that the same are by way of illustration and example only and not by way of limitation.

In the drawings:

Fig. 1 is a vertical sectional view illustrating one embodiment of this invention and showing a string of pipe suspended in its supporting structure with suitable seals and testing means in place thereabout.

Fig. 2 is a vertical sectional view of the part which carries the seals and testing means illustrated in Fig. 1.

Fig. 3 is a view similar to Fig. 1 illustrating a different embodiment of this invention.

Figure 4:
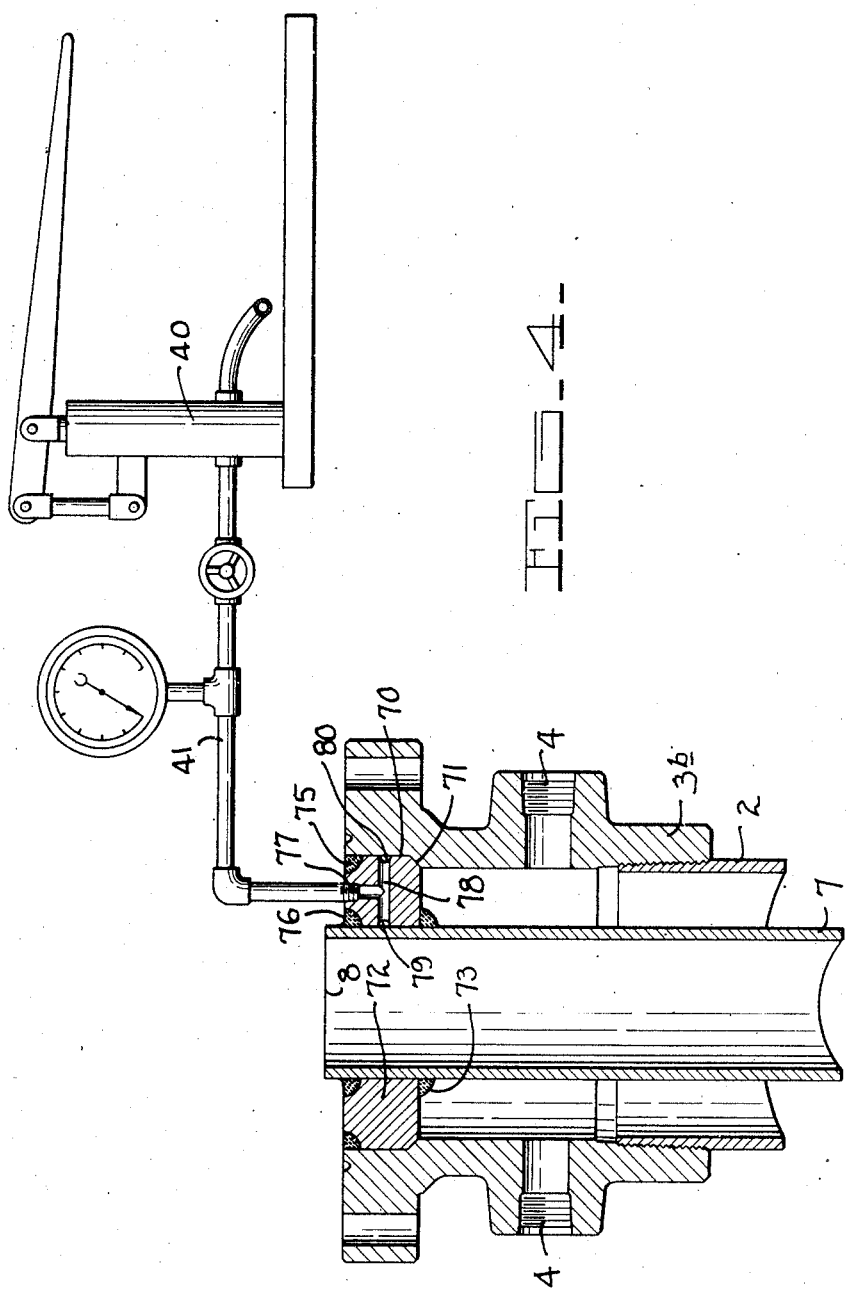
Fig. 4 is a view similar to Figs. 1 and 3 but illustrating still another embodiment of the invention.

For the sake of convenience in reference, the term "casing head" is being used throughout the specification and claims to designate an annular member which may be supported by the surface casing of a well and within which a well casing or other pipe may be suspended and sealed.

In Fig. 1 the surface casing is indicated generally at 2 and the casing head 3 is mounted thereon. The outlets 4 are provided on the casing head and it is arranged to receive an adaptor bushing 5 and a set of slips 6 by which the string of pipe 7 may be supported in the well until it has been properly landed. This string of pipe may be the production string of casing or any subsequent string of pipe such as the tubing which may be run into the well; and the present description is intended to apply to any or several strings of pipe which may be landed in this manner.

The string of pipe 7 is of suitable length to extend down into the well and the usual practice is to run this pipe into the well by connecting adjacent sections until the desired length is in the well. The pipe is then marked at a point such as 8 at which it is to be cut off, so that the upper end will be at the desired elevation. The pipe is then cut off while suspended by the slips 6. A radially extending annular member, shown in the drawings as a hold-down or attaching flange or body 10 is then slipped down over the upper end of the pipe.

The flange 10 in this instance is of peculiar construction in that it has an outstanding base portion 11 and an upstanding neck 12. The lower edge 13 is arranged to engage the upper end of the bushing 5 inside of the opening in the casing head 3.

The outer periphery of the flange 10 is beveled at 23 between shoulders 14 and 15 so that the ring 16 which rests on surface 23 will form a seal with the flange 10 and with the inclined face 25 of the spacer ring 18. The ring 17 is arranged to fit in a groove 19 in the top of a casing head, while the ring 16 fits into the cap member 20 in the groove 21 therein. The lower outer edge of the spacer ring 18 is beveled at 26 to engage the seal ring 17 which also fits in a complementary groove 27 in the cap 20. In this manner the flange 10 is held securely in position and is sealed with both the casing head 3 and the cap 20. The bolts 28 can be attached to hold the cap 20 firmly against the sealing assembly so as to clamp the flange 10 firmly in position.

The flange 10 has a packing disposed on the inner lower portion thereof by having the ring 31 fixed in position by the welding bead 33. The ring 31 is recessed to receive a lip type of packing ring 34 having the lip portions 35 thereof facing upwardly to prevent the downward flow of pressure thereby.

The upper end of the flange 10 is recessed at 37 so as to receive the bead 38 of welding material to bond the pipe 7 to the flange or body. This arrangement is best seen in Fig. 1. It will be understood that some other form of packing may be employed in place of the welding bead 38 to provide the upper seal between the pipe and the flange or body, but the weld is ordinarily preferred because it both provides a seal and tends to assist in supporting the pipe. When the pipe 7 is in position as seen in Fig. 1, the inner periphery of the packing 34 will fit closely against the pipe and form a seal therewith. This seal will be accentuated by the introduction of pressure from a source such as the pump 40 through the pipe 41 through the opening 42 in the flange. This pressure will be confined in the area or chamber 43 formed about the pipe inside of the flange 10 and between the top weld 38 and the packing 34. In this manner any desired pressure may be applied in order to test the weld 38 to determine whether or not it will leak when subjected to pressure. Such procedure is desirable before the other fittings are fixed to the top of the well head so as to prevent the escape of pressure downwardly around the pipe 7 after the well has been placed in operation and high pressure exists within the pipe 7. The flange 10 may take various forms so long as it is capable of being sealed to the casing head or the like and to the pipe by a plurality of seals, one of which may be the welding material bonding the pipe to the flange.

Fig. 3 shows another arrangement for practicing the invention, wherein the casing head 3a is somewhat elongated as regards the form of Fig. 1 and has a seat 50 defining the lower end of the opening 51 therein. This seat is arranged to receive a support ring 52 on which a packing assembly 53 is disposed. This assembly is kept in alignment by rods such as 54 and is held in position by a tapered bushing 55. This bushing has a tapered seat 56 therein to receive the slips 57 whereby the pipe 7 is supported, the same as in the previous form.

After the pipe has been stretched and suspended on the slips, it may be cut off at 8 and a radially extending annular member in the form of a closure ring or flange 58 can be inserted in the top of the casing head. This ring or flange will be fixed to the head by a bead 59 of welding material, or a seal may be formed between the ring or flange and the head in any other desired manner. The pipe 7 likewise will in turn be fixed to the ring or flange by a bead 60 of welding material or will be sealed thereto by other suitable sealing means.

The structure just described provides a chamber 62 inside of the casing head between the ring or flange 58 and the top of the packing assembly 53, which is the same as the chamber 43 in Fig. 1, except that in this case the slips which grip the casing and suspend the same are located within this chamber so that they grip the pipe within the area which is to be subjected to the testing pressure. The pump 40 of Fig. 1 and the pipe 41 are connected into the opening 42a so as to apply pressure to this chamber 62. In this manner the welds or other seals 59 and 60 may be tested for leakage as previously described.

Fig. 4 shows still another arrangement for practicing the invention, wherein the casing head 3b has a relatively shallow opening 70 therein having a beveled seat 71. The pipe 7 is arranged to have a radially extending annular member such as the flange or body 72 affixed thereto by a bead 73 of welding material. This body or flange 72 will be affixed to the pipe at the desired elevation and will serve the combined function of being attached to the pipe by the weld so as to form a seal with the pipe and also serves to support the pipe replacing the slips 6 of Fig. 1 and 57 of Fig. 3. When this flange is connected by the weld 73, the pipe can be lowered slightly to seat the flange in the head 3b and form a seal therewith. The bead of welding 75 will be used to affix the flange to the head 3b and the second bead 76 of welding material will bond the pipe to the flange. This provides an exceptionally rigid connection for the pipe to the head which is capable of withstanding tremendous pressures.

When it is desired to test the welds 73, 75 and 76, the pump 40 and pipe connection 41 may be attached to the opening 77 in the top of the body or flange 72. This opening connects with the lateral passage 78, which in turn opens into the inner groove 79 and the outer groove 80. In this manner pressure can be applied around the pipe and inside of the head so as to test all three of the welds for leakage.

It will be appreciated that in the forms illustrated in Figs. 1, 2 and 4, the zone around the pipe which is to be subjected to the testing pressure will be free of any mechanical pressure whatsoever so that there will not be the possible tendency to collapse the pipe which might exist where the pipe is gripped by slips within the zone to which the testing pressure is applied. In other words, the pipe which is being suspended will not be called upon to withstand both the testing pressure and some other pressure such as the pressure applied by the slips in gripping the pipe to suspend the same. This is a very great advantage where exceedingly high pressures are being encountered in the well because then high test pressures must be employed, and these added to the gripping force exerted by the slips suspending the pipe might be greater than the pipe would stand. Also, in cases where such high pressures are encountered in the well it is usual that the well will be relatively deep and consequently that the weight of the pipe suspended on the slips will be great and the resulting gripping force of the slips against the pipe will be great. These cumulative factors will under such circumstances result in the placing of tremendous compressive stresses on the pipe and the likelihood of collapse of the pipe as a result thereof is greatly minimized by arrangements such as illustrated in Figs. 1, 2 and 4 wherein the testing pressure is applied to a zone on the pipe that is not otherwise subjected to mechanical pressure as from the slips or the like.

It is further to be appreciated that while the sealing and testing methods described herein is described and illustrated in connection with the sealing of pipe within a casing head, it might be employed in connection with the sealing and testing of the seals of pipe or the like within some other annular member, and it might be employed in connection with the testing of seals other than seals formed by welds such as illustrated and described.

It will be apparent however that a means and method has been provided whereby a pipe or the like may be sealed within a casing head or other annular member and the seal tested for leakage, as well as for accomplishing the other objects sought by this invention.

Having described my invention, I claim:

1. A pipe seal for wells including an annular body adapted to be supported on an outer pipe, a string of pipe welded in said body, and a fluid-tight seal between the pipe and said body and spaced below the weld.

2. A device for testing the weld made between the pipe and the well head when the pipe is suspended in the well head comprising a weld between the pipe and the head, a seal about the pipe below the weld, and means for applying fluid pressure to the area between the seal and the weld.

3. A method of testing for leakage a weld which is applied at a casing head in the operation of suspending and welding a string of pipe in the well, which comprises the steps of suspending, sealing and welding the pipe in the casing head, then introducing fluid pressure to an area in the well head below the weld above the seal and about the pipe so that the pressure will be confined between the seal about the pipe and the weld, and determining whether the weld provides a seal by the retention of the applied pressure.

4. A pipe seal for casing heads including a body, a string of pipe welded in said body, and a fluid-tight seal between the pipe and said body, sealing the body to the pipe and spaced below the weld.

5. In combination, a casing head, means to support a string of pipe therein, a radially extending annular member about the pipe and sealed to the casing head, a weld bonding the pipe to said annular member, a seal between the pipe and the combined casing head and annular member below said weld, and means to introduce pressure fluid between the weld and seal to test the weld.

6. In combination, a casing head, a pipe therein, a packing assembly in said head about said pipe, pipe supporting slips in said head above said packing; means bonding said pipe to said head, and means to test the bond by introducing pressure between the bond and packing.

7. A pipe seal for casing heads having a pipe suspended therein, including means welded to the upper end of said pipe and sealing with said casing head, means to seal between said pipe and said head below said welded means, and additional means to admit fluid under pressure to the interior of said casing head and about said pipe between said welded means and said sealing means to test for leakage.

8. A device of the character described including a casing head, an inner pipe suspended therein, means welded to the upper end of said pipe and sealing with said casing head, a seal ring engaging said pipe below said means, pipe supporting means on said ring, and means through which pressure fluid may be admitted into the space between said sealing members to test for leakage.

9. A device of the character described including a casing head, means to suspend a pipe therein, upper sealing means to seal between the upper end of said pipe and said casing head, a sealing member between said pipe and casing head spaced below said sealing means, and means to admit fluid under pressure into said casing head about said pipe and between said sealing means and sealing member to test for leakage about said sealing means and sealing member.

10. A method of sealing and testing for leakage between a casing head and a pipe suspended therein, comprising welding a sealing member about the upper end of said pipe, forming a seal between said member and said casing head, installing a seal ring to provide a seal between said pipe and said casing head at a level spaced below said upper seal, and forcing a pressure fluid between said weld and said seal ring to ascertain whether the seal formed by said weld and seal ring are tight.

11. In a structure comprising a casing head, having a pipe suspended therein, and means to seal between the upper end of said pipe and said casing head, the method of testing said sealing means including, installing a seal ring between said pipe and said casing head at a level spaced below said first mentioned means to seal and forcing a pressure fluid between said first mentioned means to seal and said seal ring to ascertain whether the seals formed by said means to seal and said seal ring are tight.

12. A pipe seal for casing heads having a pipe suspended therein, including a welded connection between the upper end of said pipe and said casing head, means to seal between said pipe and said head below said connection, and additional means to apply fluid under pressure to the interior of said casing head and about said pipe between said connection and said seal to test for leakage.

13. A device of the character described including a casing head, an inner pipe suspended therein, means welded to the upper end of said pipe to seal with said casing head, a seal ring engaging said pipe below said means, and means whereby pressure fluid may be forced into the space between said sealing members to test for leakage.

14. A device of the character described including a casing head, means to suspend a pipe therein, upper sealing means to seal between the upper end of said pipe and said casing head, a sealing member about said pipe spaced below said sealing means, and means to force fluid under pressure into the space about said pipe and between said seals to test for leakage above said seal.

15. The method of testing for leakage between a casing head and a pipe suspended therein, comprising forming a seal about the upper end of said pipe and between the same and said casing head, installing a seal ring between said pipe and said casing head at a level spaced below said upper seal and forcing a pressure fluid into the space between said seal and said seal ring, and observing whether said seals are tight.

16. The method of testing for leakage between a casing head and a pipe suspended therein, comprising welding a sealing member about the upper end of said pipe and between the same and said casing head, installing a seal ring between said pipe and said casing head at a level spaced below said upper seal, and forcing a pressure fluid into the space between said weld and said seal ring, and observing whether said seals are tight.

17. A pipe seal for well head assemblies including a body, a string of pipe having a part in said body, a pair of spaced fluidtight seals around the periphery of the pipe in said body, and means for admitting fluid under pressure into the space within said body between said seals to test the same.

18. A pipe seal for casing heads having a pipe suspended therein including means welded to the upper end of said pipe and sealing with said casing head, means to seal between said pipe and said head below said first welded means, and means to admit fluid under pressure to the interior of said casing head about said pipe between said welded means and said sealing means, to test for leakage.

19. A device of the character described including a casing head, an inner pipe suspended therein, means welded to the upper end of said pipe and sealing with said casing head, a seal ring within the head and engaging the head and pipe below the point at which said means is welded thereto, pipe supporting means on said ring, and means through which pressure fluid may be admitted into the space between said welded means and sealing ring to test for leakage.

20. A device of the character described including an annular member, means to suspend a pipe therein, upper sealing means to seal between the upper end of said pipe and said annular member, a sealing member between said pipe and said member spaced below said first sealing means, and means to admit fluid under pressure into said annular member about said pipe and between said sealing means and sealing member to test for leakage past said sealing means and sealing member.

RURIC N. BEAN.